F. E. SMALL.
PACKING RING.
APPLICATION FILED FEB. 24, 1919.

1,437,563.

Patented Dec. 5, 1922.

Inventor
Frederick E. Small
by Roberts, Roberts & Cushman
his Attorneys

Patented Dec. 5, 1922.

1,437,563

UNITED STATES PATENT OFFICE.

FREDERICK E. SMALL, OF NEEDHAM, MASSACHUSETTS, ASSIGNOR TO PRESSURE PROOF PISTON RING COMPANY, OF BOSTON, MASSACHUSETTS, A CORPORATION OF MASSACHUSETTS.

PACKING RING.

Application filed February 24, 1919. Serial No. 278,636.

*To all whom it may concern:*

Be it known that I, FREDERICK E. SMALL, a citizen of the United States, and resident of Needham, in the county of Norfolk and State of Massachusetts, have invented new and useful Improvements in Packing Rings, of which the following is a specification.

This invention relates to packing rings and more particularly to a piston ring for use in internal combustion engines to close the passage between the piston and cylinder, this invention being in the nature of an improvement on the invention described and claimed in my former Patents No. 1,129,910 granted March 2, 1915, and No. 1,173,319 granted February 29, 1916.

The improved packing disclosed in my aforesaid patents comprises an outer ring and an inner ring adapted to fit in a groove in a piston and close the space between the piston and the cylinder. The outer ring is adapted to bear against one side of the groove in the piston and against the cylinder, the outer periphery of the ring being substantially cylindrical to fit the cylinder and the side of the ring being parallel to the side of the groove so as to fit snugly thereagainst. The outer ring is divided at least at one point to permit it to be placed in the groove and to permit it to be forced against the cylinder after being placed in the groove. The inner periphery of the outer ring is beveled toward the end opposite the aforesaid end which engages one side of the groove. The inner ring is arranged to expand against the beveled surface of the outer ring so as to force the outer ring against the cylinder and longitudinally of the piston against the wall of the groove, the inner ring preferably being substantially circular in cross section.

Under ordinary conditions the aforesaid arrangement is highly satisfactory. However, in the case of high speed engines where the motion of the piston is rapid and is quickly reversed there is a tendency for the outer ring owing to its momentum or inertia to separate slightly from the side of the groove against which it is held by the inner ring, particularly at the instant of the reversal of movement of the piston in the direction on that side of the ring bearing against the wall of the piston groove. The particular object of the present invention is to avoid such separation of the outer ring from the wall of the groove under any circumstances.

Other objects of the invention will be apparent from the following description and accompanying drawings in which—

Figure 1:
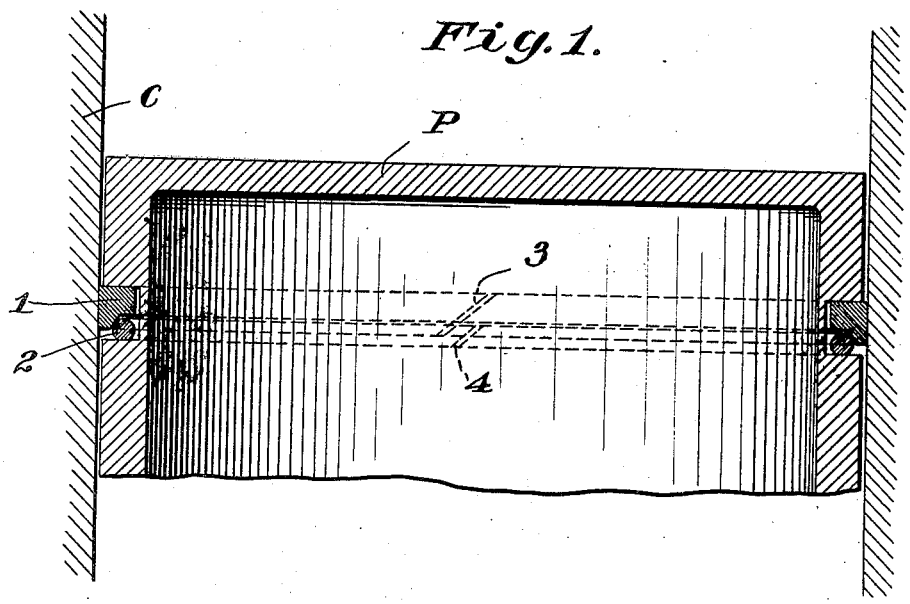
Figure 2:
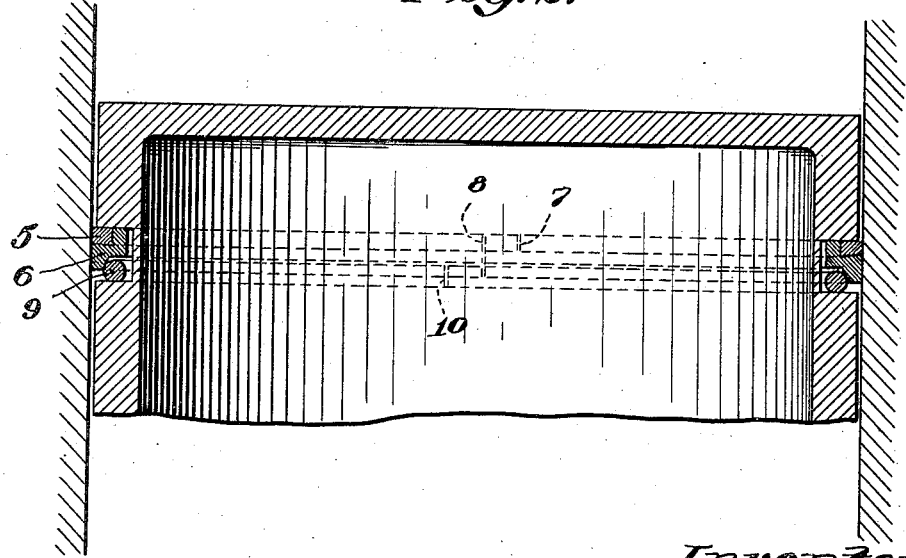

Fig. 1 is a central longitudinal section of a portion of a piston and cylinder to which the present invention is applied in one form; and Fig. 2 is a similar view of the piston and cylinder to which the present invention is applied in slightly modified form.

The particular embodiment of the invention illustrated in Fig. 1 comprises an outer ring 1 and an inner ring 2 adapted to fit into a groove in a piston P operating in a cylinder C. The outer ring 1 is illustrated in Fig. 1 as being divided only at one point, viz., the point 3. The inner ring is preferably divided only at one point as illustrated at 4 in Fig. 1. The outer periphery at the outer ring 1 is preferably substantially equal in diameter to the diameter of the cylinder C and its upper side is perpendicular to the axis of the piston so as to engage squarely against the upper side of the groove in the piston. The follower ring 2 is normally of considerably larger diameter than shown in Fig. 1 so that it must be compressed into the position shown in Fig. 1 when applied to the piston. The follower ring will then tend to expand and force the outer ring 1 outwardly against the cylinder. By making the inner periphery of the outer ring beveled throughout the portion engaging the inner ring the outward expansion of the inner ring also forces the outer ring upwardly against the upper side of the piston groove. In order to permit the outer ring to be readily inserted into the piston groove and removed therefrom it is preferably made substantially narrower than the groove so as to leave a clearance of say fifteen thousandths of an inch between the lower side of the ring and the lower side of the groove.

In my aforesaid patents the tapered surface of the outer ring was extended to the inner periphery of the ring. According to the present invention the tapered surface of the outer ring is extended only to a plane slightly above the plane of the upper edge of the follower ring and the surface is then continued outwardly to the inner periphery of the ring in a plane substantially perpendicular to the axis of the piston, thus forming a shoulder overhanging the follower ring, such shoulder preferably being of a radial extent substantially equal to the cross sectional diameter of the follower ring. The clearance between this shoulder and the follower ring is sufficiently small substantially to prevent the outer ring from being separated from the upper side of the groove, this clearance preferably being of the order of two thousandths of an inch for pistons of the size commonly employed in automobiles.

The modification illustrated in Fig. 2 differs from the embodiment shown in Fig. 1 in that the outer ring is formed of two parts 5 and 6, the outer part being divided at 7 and the inner part being divided at 8. By making the outer ring in two parts each portion of the ring serves to close the space between the ends of the other portion when the spaces between the ends of the respective portions are staggered as illustrated at 7 and 8. The inner ring 9 may be divided at a single point 10 as in Fig. 1.

The operation of my improved packing ring is as follows: When the piston reciprocates in the cylinder at a moderate rate the follower ring holds the outer ring against the cylinder and against one side of the groove so as to maintain compression, prevent leakage of oil or gas, and prevent the fire of the explosions from passing the packing. However when the piston is reciprocated at an unusually high rate the upper wall of the groove in the piston tends to separate from the upper surface of the outer piston ring especially at the instant that the piston reverses from downward motion to upward motion. By providing a shoulder on the outer ring overhanging the follower ring and by providing a very small clearance between the shoulder and follower ring, for example of the order of two thousandths of an inch, the shoulder engages the follower ring and prevents the upper wall of the groove from separating from the upper surface of the outer ring a sufficient amount to permit loss of compression or to permit fire to pass the ring into the oil chamber, especially when the separation occurs only momentarily at the time the piston reverses its motion at the lower end of its cycle of reciprocation.

What I claim is:

1. In combination, a cylinder, a piston loose within the cylinder and having an annular groove, and a packing in said groove comprising a resilient packing ring having a beveled surface at its inner side, the normal outer circumference of said ring being substantially the same as that of the cylinder, said packing ring being substantially less in width than the width of said groove so that a clearance is provided between one side of said packing ring and one side of said groove, and a spring follower ring of circular cross section engaging the beveled surface of the packing ring and one wall of the groove so as to urge said packing in both a radial direction and an endwise direction against the opposite wall of the groove, said packing ring having a shoulder overhanging said follower ring and of a radial extent to project beyond the cross sectional axis of said ring, said shoulder being normally out of engagement therewith but in close proximity thereto so as to restrict the endwise movement of the packing ring in the groove to a negligible amount.

2. In combination, a piston having an annular groove therein, and a packing in said groove comprising a resilient packing ring L-shaped in cross-section and divided at one point, said ring having a beveled surface at its inner side, a second divided resilient packing ring filling the inner angle of said L-shaped ring and arranged to break joint therewith, the laterally extending flange of the L-shaped ring which forms one side of said inner angle being undercut to overlap the second ring and prevent the expansion of said second ring out of said inner angle, the combined width of said rings being substantially less than the width of said groove, whereby a clearance is provided between one side of said packing rings and one side of said groove, and a spring follower ring of substantially circular cross section engaging the beveled surface of said L-shaped packing ring and one wall of said groove so as to urge said two packing rings in both a radial direction and an endwise direction on the piston against the opposite wall of said groove, said L-shaped packing ring having a shoulder overhanging said follower ring in close proximity thereto and being of a radial extent substantially equal to the cross sectional diameter of the ring so as to prevent a substantial endwise movement of the rings in the groove.

Signed by me at Boston, Massachusetts, this 20th day of February, 1919.

FREDERICK E. SMALL.